UNITED STATES PATENT OFFICE.

HENRY BULL, OF BASLE, SWITZERLAND, AND CARL LUDWIG MÜLLER, OF LUDWIGSHAFEN-ON-THE-RHINE, GERMANY, ASSIGNORS TO THE BADISCHE ANILIN AND SODA FABRIK, OF MANNHEIM, GERMANY.

SULPHONATED PURPLE DYE-STUFF FROM BENZYLDIPHENYLAMINE.

SPECIFICATION forming part of Letters Patent No. 346,022, dated July 20, 1886.

Application filed April 16, 1886. Serial No. 199,126. (Specimens.)

*To all whom it may concern:*

Be it known that we, HENRY BULL, a citizen of the Kingdom of Norway, residing at Basle, in the canton of Basle, Switzerland, and CARL LUDWIG MÜLLER, a subject of the King of Bavaria, residing at Ludwigshafen-on-the-Rhine, in the Empire of Germany, have invented new and useful Improvements in the Manufacture of a Sulphonated Purple Dye-Stuff or Coloring-Matter from Benzyldiphenylamine, of which the following is a specification.

This invention relates to the manufacture of a sulphonated purple dye-stuff or coloring-matter from the basic derivative resulting from the condensation of tetramethyldiamidobenzophenone with benzyldiphenylamine.

In carrying out our invention we take about 1.5 parts, by weight, of tetramethyldiamidobenzophenone and mix the same with 1.5 parts, by weight, of benzyldiphenylamine. We then quickly add a mixture of 0.84 parts, by weight, of oxychloride of phosphorus with 0.40 parts, by weight, of toluol. The mixture thus produced is then heated until its inside temperature has reached about 80° centigrade, when, without any further application of heat, the temperature will run up to about from 100° to 115° centigrade, at which range it is to be kept during the space of about two hours. The bronze-colored "melt" thus obtained is first digested with about twenty parts of boiling water holding about one part, by weight, of common salt in solution. The resulting acid and saline solution, after being allowed to cool down and to settle, is then separated from the undissolved residue by decantation. The said undissolved residue is afterward exhausted with about eighty parts of boiling water. The dark purple solution thus obtained is filtered at a boiling-heat and precipitated with common salt. The resulting precipitate is filtered, pressed, and dried.

In order to convert the basic derivative thus produced into our new coloring-matter possessing acid properties, and therefore capable of dyeing in an acid bath, the known methods of sulphonization may be employed. Practical results are obtained by treating the said basic coloring-matter with highly-rectified or, by preference, fuming sulphuric acid at a temperature requiring to be regulated according to the strength of the sulphuric acid employed. The action of rectified sulphuric acid proceeds best at a temperature of about 100° centigrade, while fuming sulphuric acid effects the desired sulphonization at a correspondingly lower temperature, or without any external application of heat. As an example, we proceed as follows: About 1.25 parts, by weight, of the basic derivative (produced, as before described, by the condensation of tetramethyldiamidobenzophenone with benzyldiphenylamine) are added in the cold, and in small portions at a time, to about five parts, by weight, of rectified sulphuric acid containing about ninty-eight per centum of monohydrate $(SO_4H_2.)$ The acid mixture is kept well agitated until no more undissolved particles can be discerned. Then another supply of 7.5 parts, by weight, of rectified sulphuric acid containing about ninety-nine per centum of monohydrate $(SO_4H_2)$ is added, and the temperature of the solution is gradually raised to about 100° centigrade, at which height it is to be kept during about two hours. The sulphonization being thus accomplished the solution is first allowed to cool down and then carefully diluted with about sixty parts of cold water, when a precipitate of the sulphonated coloring-matter will form, which, after being separated from the acid mother-liquor by filtering and pressing, may be converted into its corresponding sodium salt by mixing the same with a concentrated solution of about 0.35 parts, by weight, of carbonate of soda, dissolving afterward the sodium salt thus obtained in about eighty-five parts of boiling water, filtering the solution and evaporating the same to dryness.

As an example of the manner in which fuming sulphuric acid may be employed, we proceed as follows: About one part, by weight, of the before-named dry and finely-powdered basic derivative is gradually added in very small portions at a time to about five parts, by weight, of fuming sulphuric acid containing about twenty-three per centum of free sulphuric anhydride. The acid mixture is externally surrounded with ice, and care is taken to prevent any rise of its temperature beyond 10° centigrade. The solution thus obtained, after being first allowed to stand at a temperature of about from 5° to 10° centigrade during the space of about twelve hours, is afterward carefully diluted with about twenty times its own volume of ice-cold water, and then rendered slightly alkaline by gradually adding caustic-soda liquor. The alkaline solution is filtered, carefully neutralized with muriatic acid, and precipitated with common salt. The blue flocculent precipitate thus obtained is then filtered, pressed, and dried.

The sulphonated dye-stuff or coloring-matter (produced in the usual mercantile form of a sodium salt, as before described) presents the following characteristics: It has the appearance of a dark-blue powder possessing a bronze-like luster. It is sparingly soluble in cold water, but easily soluble in hot water with a bright bluish-purple color. By the addition of caustic alkalies the said purple color of the aqueous solution becomes gradually destroyed, but is restored upon neutralizing the free alkali with a mineral or organic acid. Rectified sulphuric acid dissolves the dye-stuff with a yellow-red color, which upon the addition of water turns blue, a dark-blue precipitate of the free sulpho-acid being formed at the same time. Strong hydrochloric acid produces a red-brown solution. By submitting an intimate mixture of the dye-stuff with caustic lime to destructive distillation a basic oil distills over, possessing a peculiarly aromatic characteristic smell, and partly insoluble in dilute hydrochloric acid, the insoluble portion of the same developing a blue color in the presence of nitric acid.

If the dye-stuff described in Patent No. 297,415, granted to A. Kern April 22, 1884, be mixed with caustic lime and the mixture exposed to destructive distillation, an oil will be formed which will not develop any blue color when treated with nitric acid. Furthermore, the purple dye-stuff described in the above specification is soluble in dilute alkaline solutions, whereas the dye-stuff described in Patent No. 297,415 is not soluble in dilute alkaline solutions. Strong hydrochloric acid changes the color of the solutions of the dye-stuff described in Patent No. 297,415 into an orange-yellow, whereas applicants' dye-stuff dissolves in strong hydrochloric acid into a red-brown solution.

The new dye-stuff, if employed in the process of dyeing and printing in a similar manner as the hitherto known sulphonated coloring-matters, is capable of imparting to animal fiber a bright bluish-purple color resisting the action of acids.

What we claim as new, and desire to secure by Letters Patent, is—

As a new product, the purple dye-stuff or coloring-matter produced by the sulphonization of the basic derivative resulting from the condensation of tetramethyldiamidobenzophenone with benzyldiphenylamine, as hereinbefore described, and having the characteristics above set forth.

In testimony whereof we have hereunto set our hands in the presence of two subscribing witnesses.

HENRY BULL.
CARL LUDWIG MÜLLER.

Witnesses for Henry Bull:
  GEORGE GIFFFORD,
  CHS. A. RICHTER.
Witnesses for Carl Ludwig Müller:
  J. C. MONAGHAN,
  HY. SCHAEFFIR.